(12) United States Patent
Ramappan et al.

(10) Patent No.: US 8,276,551 B2
(45) Date of Patent: Oct. 2, 2012

(54) HCCI COMBUSTION MODING STATE CONTROL FOR FUEL ECONOMY AND SEAMLESS TRANSITIONS

(75) Inventors: Vijay Ramappan, Novi, MI (US); Jun-Mo Kang, Ann Arbor, MI (US)

(73) Assignee: GM Global Technology Operations LLC

( * ) Notice: Subject to any disclaimer, the term of this patent is extended or adjusted under 35 U.S.C. 154(b) by 910 days.

(21) Appl. No.: 12/345,775

(22) Filed: Dec. 30, 2008

(65) Prior Publication Data

US 2010/0162991 A1 Jul. 1, 2010

(51) Int. Cl.
F02B 1/12 (2006.01)
F02B 75/02 (2006.01)
F02B 3/00 (2006.01)
F02D 19/10 (2006.01)
F02P 5/00 (2006.01)

(52) U.S. Cl. .................. 123/27 R; 123/406.24; 123/294
(58) Field of Classification Search .................. 123/21, 123/27 R
See application file for complete search history.

(56) References Cited

U.S. PATENT DOCUMENTS

| | | | | |
|---|---|---|---|---|
| 4,512,319 A * | 4/1985 | Williams et al. | | 123/492 |
| 5,875,743 A * | 3/1999 | Dickey | | 123/25 C |
| 6,102,019 A * | 8/2000 | Brooks | | 123/674 |
| 6,463,907 B1 * | 10/2002 | Hiltner | | 123/304 |
| 6,493,626 B2 * | 12/2002 | Mitani et al. | | 701/103 |
| 6,953,024 B2 * | 10/2005 | Linna et al. | | 123/435 |
| 7,121,255 B2 * | 10/2006 | Liu et al. | | 123/305 |
| 7,194,996 B2 * | 3/2007 | Koopmans | | 123/295 |
| 7,222,606 B2 * | 5/2007 | Yoshino et al. | | 123/406.37 |
| 7,311,079 B2 * | 12/2007 | Surnilla et al. | | 123/325 |
| 7,328,683 B2 * | 2/2008 | Weiss et al. | | 123/299 |
| 7,392,774 B2 * | 7/2008 | Magner et al. | | 123/90.17 |
| 7,481,185 B1 * | 1/2009 | Park et al. | | 123/21 |
| 7,509,932 B2 * | 3/2009 | Hara et al. | | 123/90.15 |
| 7,640,744 B2 * | 1/2010 | Rollinger et al. | | 60/605.1 |
| 7,685,819 B2 * | 3/2010 | Vetrovec | | 60/611 |
| 7,703,438 B2 * | 4/2010 | Petridis et al. | | 123/406.55 |
| 7,717,084 B2 * | 5/2010 | Kurotani et al. | | 123/295 |
| 7,730,717 B2 * | 6/2010 | Ogawa et al. | | 60/285 |
| 7,818,112 B2 * | 10/2010 | Kuzuyama | | 701/103 |
| 2003/0056736 A1 * | 3/2003 | Unger et al. | | 123/27 R |
| 2007/0119417 A1 * | 5/2007 | Eng et al. | | 123/305 |
| 2008/0066713 A1 * | 3/2008 | Megli et al. | | 123/295 |
| 2008/0215227 A1 * | 9/2008 | Boehme et al. | | 701/103 |
| 2008/0294325 A1 * | 11/2008 | Kurotani et al. | | 701/102 |

* cited by examiner

*Primary Examiner* — Nathaniel Wiehe
*Assistant Examiner* — Tea Holbrook

(57) ABSTRACT

A method and system for controlling an engine includes a homogeneous charge compression ignition (HCCI) operating zone boundary module determining a first HCCI operating boundary and a fuel rate module determining a first fuel rate from an operator input. The system also includes a switch module modifying the first HCCI operating boundary to a modified boundary in response to a measured mass airflow, cam positions and the first HCCI operating boundary. The system also includes a combustion control module operating the engine in a spark ignited mode when a second fuel rate request is outside the modified boundary.

20 Claims, 4 Drawing Sheets

HCCI COMBUSTION MODING STATE CONTROL FOR FUEL ECONOMY AND SEAMLESS TRANSITIONS

FIELD

The present disclosure relates to engine control systems, and more particularly to engine control systems for engines operating in both spark ignition and homogenous charge compression ignition (HCCI) modes.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Engines may be operated in a spark ignition (SI) mode and a homogeneous charge compression ignition (HCCI) mode. The HCCI mode involves compressing a mixture of fuel and an oxidizer to a point of auto-ignition. One of the modes may be selected based on engine speed and load. In the HCCI mode, ignition occurs at several locations at a time, which makes a fuel/air mixture burn nearly simultaneously. The HCCI mode performs close to an ideal Otto cycle, provides improved operating efficiency (operates leaner), and generates lower emission levels as compared to SI mode. However since there is no direct initiator of combustion, the ignition process tends to be more difficult to control.

To adjust operation during the HCCI mode, a control system may alter the conditions that induce combustion. For example, the control system may adjust compression ratios, induced gas temperature, induced gas pressure, or the quantity of retained or reinducted exhaust. Several approaches have been used to perform the adjustments and thus extend the HCCI operating region.

One control approach employs variable valve timing to adjust the compression ratio. For example, the compression ratio can be controlled by adjusting when intake valves close. The amount of exhaust gas retained in a combustion chamber can be controlled by valve re-opening and/or valve overlap.

Another approach uses a "2-step" intake valve lift approach, which includes switching intake valve modes between a HIGH lift state and a LOW lift state. During the HIGH lift state, the intake valves are lifted to a HIGH level to allow for an amount of air to enter the corresponding cylinders. During the LOW lift state, the intake valves are lifted to a LOW level, which allows a smaller amount of air to enter the corresponding cylinders relative to the HIGH lift state.

The 2-step valve lift approach has a step change between SI and HCCI modes and this leads to undesirable torque disturbances during the transitions.

SUMMARY

The engine control system according to the present disclosure operates the gasoline engine in the SI mode and the HCCI mode. The HCCI mode reduces fuel consumption but is only available over a limited range of engine torques and speeds.

In one aspect of the disclosure, a method includes determining a first homogeneous charge compression ignition (HCCI) operating boundary, determining a first fuel rate from an operator input, modifying the first HCCI operating boundary to a modified boundary in response to a measured mass airflow, cam positions and the first HCCI operating boundary, and operating the engine in a spark ignited mode when a second fuel rate request is outside the modified boundary.

In yet another aspect of the disclosure, a method includes determining a mass airflow for the engine, determining an engine speed, determining a first homogeneous charge compression ignition (HCCI) fueling rate boundary in response to the engine speed, determining a cam position, when the cam position corresponds to a saturated position, modifying the first HCCI fueling rate boundary to a second modified maximum fueling rate based on the mass airflow, and entering a spark ignition mode when the desired fuel request exceeds the second maximum HCCI fueling rate.

In yet another aspect of the disclosure, a system for controlling an engine includes a homogeneous charge compression ignition (HCCI) operating zone boundary module determining a first HCCI operating boundary and a fuel rate module determining a first fuel rate from an operator input. The system also includes a switch module modifying the first HCCI operating boundary to a modified boundary in response to a measured mass airflow, cam positions and the first HCCI operating boundary. The system also includes a combustion control module operating the engine in a spark ignited mode when a second fuel rate request is outside the modified boundary.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The present disclosure will become more fully understood from the detailed description and the accompanying drawings, wherein.

DETAILED DESCRIPTION

Figure 1A:
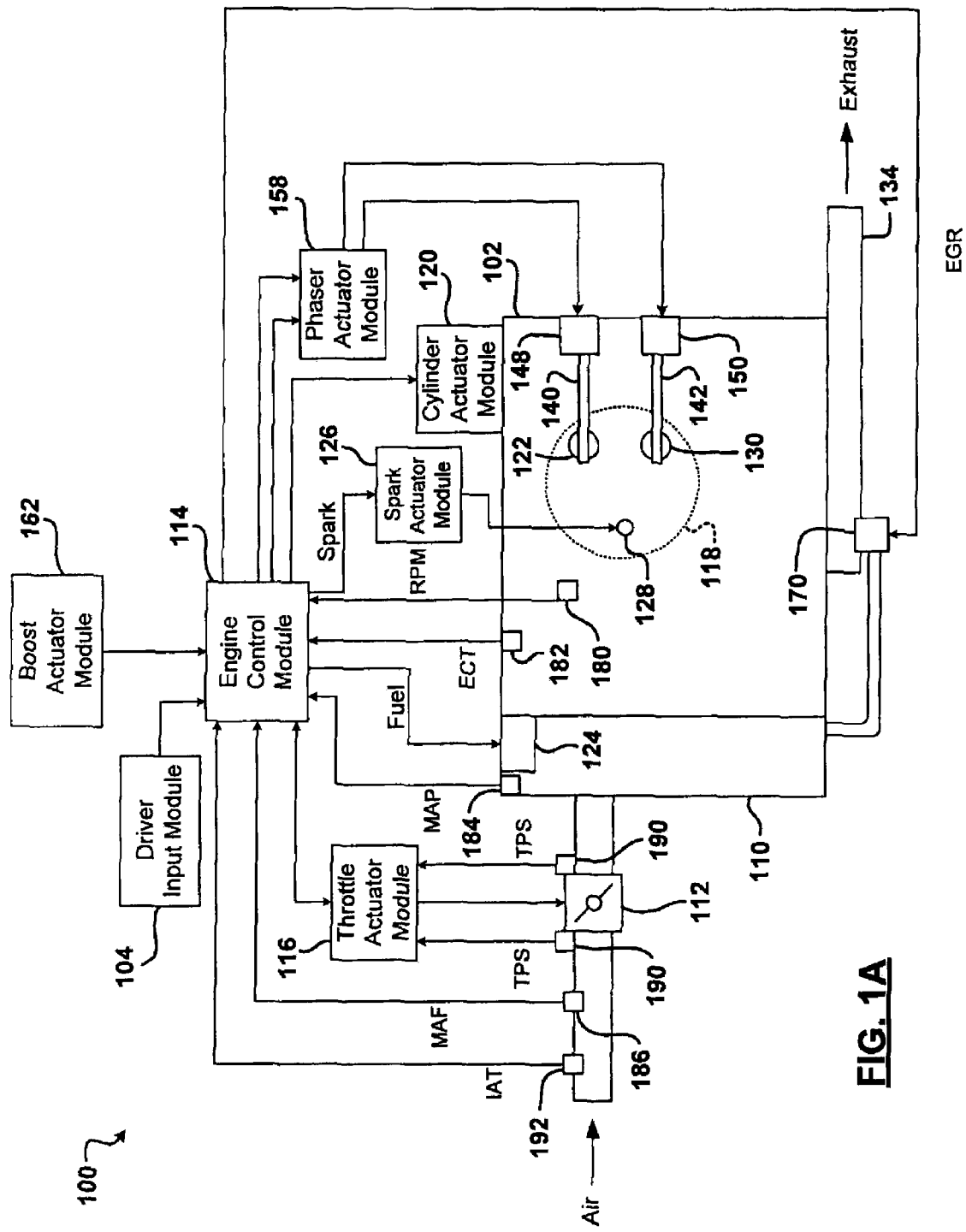
FIG. 1A is a functional block diagram of an engine control system that operates in SI and HCCI combustion modes according to the present disclosure.

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality.

The engine control system according to the present disclosure operates the gasoline engine in the SI mode and the HCCI mode. The HCCI mode reduces fuel consumption but is only available over a limited range of engine torques and speeds. For example only, the engine control system may operate the engine in the HCCI mode at low to mid loads and low to mid engine speeds. The engine control system may operate the engine in the SI mode at other loads and engine speeds. The HCCI operating zones may be defined by operating maps in calibration tables.

The engine may be a direct injection gasoline engine and may be selectively operated in a stratified operating mode during the transitions. To operate in the stratified operating mode, the fuel injectors inject the fuel into an area of the cylinder, often a small "sub-cylinder" at the top, or periphery, of the main cylinder. This approach provides a rich charge in that area that ignites easily and burns quickly and smoothly. The combustion process proceeds to a very lean area (often only air) where the flame-front cools rapidly and nitrogen oxides ($NO_x$) have little opportunity to form. The additional oxygen in the lean charge also combines with carbon monoxide (CO) to form carbon dioxide ($CO_2$).

Transitions between the SI mode and the HCCI mode should be seamless to the driver, minimize engine emissions and minimize fuel consumption losses.

During HCCI operation, the intake manifold pressure may be near atmospheric pressure. Transitions into and out of HCCI involve changes to intake manifold pressure and valve lift. These changes tend to cause sudden changes in air charge supplied to the cylinders. As a result, undesirable changes in engine torque will occur if not properly managed.

Referring now to FIG. 1A, a functional block diagram of an exemplary engine system 100 is presented. The engine system 100 includes an engine 102 that combusts an air/fuel mixture to produce drive torque for a vehicle based on a driver input module 104. The engine may be a direct ignition engine. Air is drawn into an intake manifold 110 through a throttle valve 112. An engine control module (ECM) 114 commands a throttle actuator module 116 to regulate opening of the throttle valve 112 and a phaser actuator module 158 to regulate the opening and closing times of intake and exhaust valves 122 and 130 and control the amount of air drawn into the intake manifold 110.

Air from the intake manifold 110 is drawn into cylinders of the engine 102. While the engine 102 may include multiple cylinders, for illustration purposes, a single representative cylinder 118 is shown. For example only, the engine 102 may include 2, 3, 4, 5, 6, 8, 10, and/or 12 cylinders.

Air from the intake manifold 110 is drawn into the cylinder 118 through an intake valve 122. The ECM 114 controls the amount of fuel injected by a fuel injection system 124. The fuel injection system 124 may inject fuel into the intake manifold 110 at a central location or may inject fuel into the intake manifold 110 at multiple locations, such as near the intake valve of each of the cylinders. Alternatively, the fuel injection system 124 may inject fuel directly into the cylinders. The position of fuel injection in the cylinder maybe central (Central injection) or off to the side (Side injection).

The injected fuel mixes with the air and creates the air/fuel mixture in the cylinder 118. A piston (not shown) within the cylinder 118 compresses the air/fuel mixture. Based upon a signal from the ECM 114, a spark actuator module 126 energizes a spark plug 128 in the cylinder 118, which ignites the air/fuel mixture. The timing of the spark may be specified relative to the time when the piston is at its topmost position, referred to as to top dead center (TDC).

The combustion of the air/fuel mixture drives the piston down, thereby driving a rotating crankshaft (not shown). The piston then begins moving up again and expels the byproducts of combustion through an exhaust valve 130. The byproducts of combustion are exhausted from the vehicle via an exhaust system 134.

The intake valve 122 may be controlled by an intake camshaft 140, while the exhaust valve 130 may be controlled by an exhaust camshaft 142. In various implementations, multiple intake camshafts may control multiple intake valves per cylinder and/or may control the intake valves of multiple banks of cylinders. Similarly, multiple exhaust camshafts may control multiple exhaust valves per cylinder and/or may control exhaust valves for multiple banks of cylinders. The cylinder actuator module 120 may deactivate cylinders by cutting off fuel and spark and/or disabling their exhaust and/or intake valves.

The time at which the intake valve 122 is opened may be varied with respect to piston TDC by an intake cam phaser 148. The time at which the exhaust valve 130 is opened may be varied with respect to piston TDC by an exhaust cam phaser 150. A phaser actuator module 158 controls the intake cam phaser 148 and the exhaust cam phaser 150 based on signals from the ECM 114. Additionally, the amount of lift on the intake and exhaust valves may be adjusted hydraulically or using other methods. The lift state of the valves is controlled by the ECM 114.

The engine system 100 may include an exhaust gas recirculation (EGR) valve 170, which selectively redirects exhaust gas back to the intake manifold 110. The engine system 100 may measure the speed of the crankshaft in revolutions per minute (RPM) using an RPM sensor 180. The temperature of the engine coolant may be measured using an engine coolant temperature (ECT) sensor 182. The ECT sensor 182 may be located within the engine 102 or at other locations where the coolant is circulated, such as a radiator (not shown).

The pressure within the intake manifold 110 may be measured using a manifold absolute pressure (MAP) sensor 184. In various implementations, engine vacuum may be measured, where engine vacuum is the difference between ambient air pressure and the pressure within the intake manifold 110. The mass of air flowing into the intake manifold 110 may be measured using a mass air flow (MAF) sensor 186.

The ECM 114 may calculate measured air per cylinder (APC) based on the MAF signal generated by the MAF sensor 186. The ECM 114 may estimate desired APC based on engine operating conditions, operator input or other parameters. The throttle actuator module 116 may monitor the position of the throttle valve 112 using one or more throttle position sensors (TPS) 190. The ambient temperature of air being drawn into the engine system 100 may be measured using an intake air temperature (IAT) sensor 192. In some instances this IAT sensor 192 may be integrated into the MAF sensor 186. The ECM 114 may use signals from the sensors to make control decisions for the engine system 100.

To abstractly refer to the various control mechanisms of the engine 102, each system that varies an engine parameter may be referred to as an actuator. For example, the throttle actuator module 116 can change the blade position, and therefore the opening area, of the throttle valve 112. The throttle actuator module 116 can therefore be referred to as an actuator, and the throttle opening area can be referred to as an actuator position.

Similarly, the spark actuator module 126 can be referred to as an actuator, while the corresponding actuator position is amount of spark advance or retard. Other actuators may include the boost actuator module 162, the EGR valve 170, the phaser actuator module 158, the fuel injection system 124, and the cylinder actuator module 120. The term actuator position with respect to these actuators may correspond to boost pressure, EGR valve opening, intake and exhaust cam phaser angles, air/fuel ratio, and number of cylinders activated, respectively.

Figure 1B:
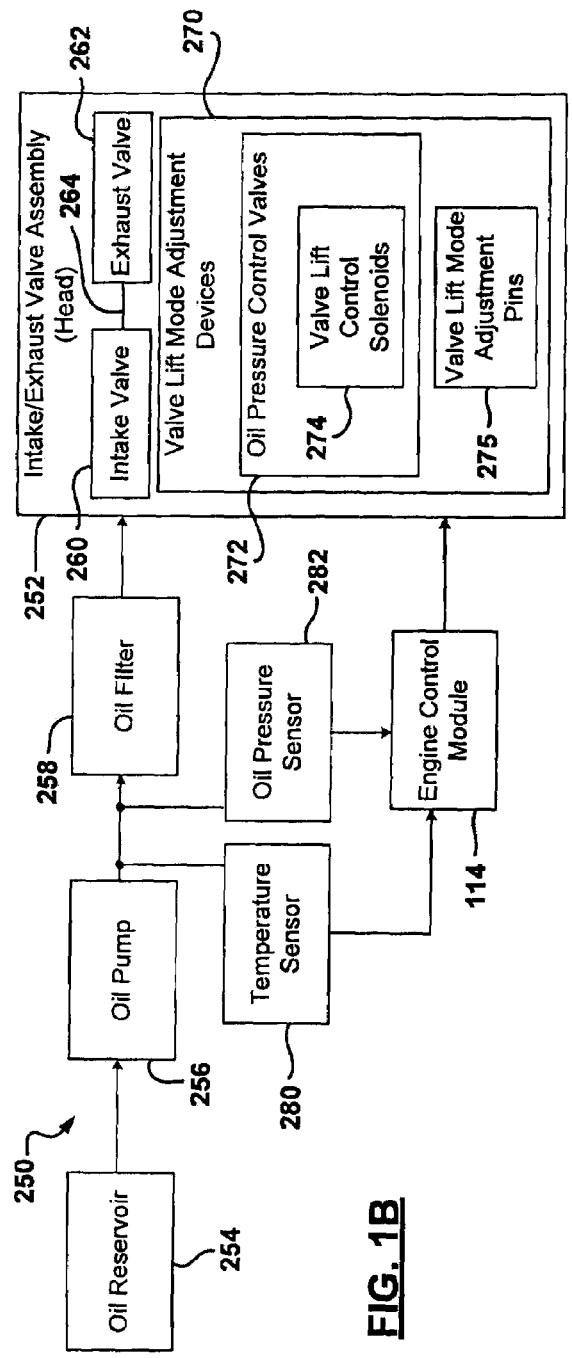
FIG. 1B is a functional block diagram of an exemplary valve lift adjustment system.

Referring now to FIG. 1B, a functional block diagram of a valve lift control circuit 250 is shown. The valve lift control circuit 250 includes an intake/exhaust valve assembly 252 that receives oil from an oil reservoir 254 via an oil pump 256. The oil is filtered through an oil filter 258 prior to reception by the valve assembly 152. The control module controls lift operation of intake and exhaust valves 260, 262 of the valve assembly 252.

The valve assembly 252 includes the intake and exhaust valves 260, 262, which have open and closed states and are actuated via one or more camshafts 264. A dedicated intake camshaft and a dedicated exhaust camshaft may be included. In another embodiment, the intake and exhaust valves 260, 262 share a common camshaft. When in an open state the intake and exhaust valves 260, 262 may be operating in various lift states.

The valve assembly 252 also includes valve lift state adjustment devices 270. The lift state adjustment devices 270 may include oil pressure control valves 272 and valve lift control valves, such as solenoids 274. Other lift state adjustment devices 275, such as lift pins, levers, rockers, springs, locking mechanisms, tappets, etc may be included.

The valve lift control circuit 250 may include an oil temperature sensor 280 and/or an oil pressure sensor 282. The control module signals the oil pressure control valves 272 based on temperature and pressure signals received from the temperature and pressure sensors 280, 282.

Figure 1C:
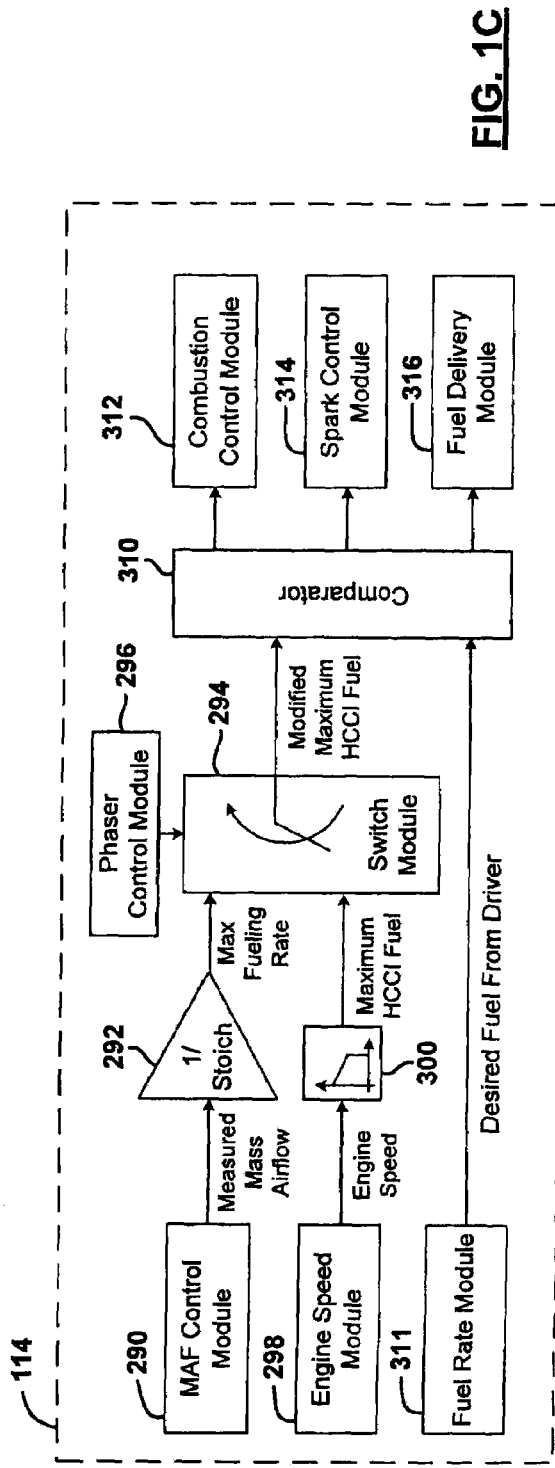
FIG. 1C is a functional block diagram of an exemplary engine control module.

Referring now to FIG. 1C, the engine control module 114 may comprise a MAF control module 290 that receives a signal from the mass airflow sensor and generates a measured mass airflow signal. The measured mass airflow signal from the MAF control module 290 is divided by the stoichiometric airflow ratio to obtain a maximum fueling in the arithmetic block 292. Of course, a multiplier block multiplying the inverse of stoichiometry may be used. Stoichiometry of a gasoline engine is typically 14.7. Of course, other fuels like E85 are contemplated. The maximum fueling rate signal is provided to a switch module 294. Another input to the switch module 294 is a phaser control module 296. The phaser control module 296 provides a signal that indicates whether or not the cams are in a saturated position. The phaser control module 296 may also control the phasers to transition between a SI and an HCCI modes. The phaser control module 296 may determine a cam phasing.

An engine speed module 298 may generate an engine speed signal that is provided to an HCCI operating zone module 300. The HCCI operating zone module 300 determines a maximum HCCI fueling signal in response to the engine speed signal from the engine speed module 298. The maximum HCCI fueling rate signal corresponds to the maximum fueling rate of the HCCI operating zone. At the maximum boundary of the HCCI operating zone, the desired air fuel ratio is stoichiometric for the three-way catalyst to minimize $NO_x$ emissions. The maximum HCCI fueling rate signal is provided to the switch module 294.

The switch module 294 receives the calculated maximum fueling rate and the maximum HCCI fueling rate and a signal corresponding to whether the cams are operating at a position corresponding to saturation. The intake and exhaust valves and thus the corresponding cam positions are mechanically saturated when the negative valve overlap (NVO) is a minimum NVO. NVO is defined as the duration in crank angle between the exhaust valve closing and the intake valve opening. When minimum negative valve overlap is achieved, then the maximum airflow condition of the HCCI engine is also achieved. When the valve timings are mechanically saturated, the desired airflow reaches a limiting value and thus a rich air fuel mixture may result. An unstable HCCI combustion near the maximum boundary of the HCCI operating zone may take place due to this inability to control airflow. The present disclosure detects and avoids these conditions by limiting the maximum boundary of HCCI operating zone based upon the intake and exhaust cam positions and the measured airflow. The switch module 294 modifies the maximum HCCI fueling rate when the calculated maximum fueling rate is smaller than the maximum fueling rate of the pre-determined HCCI operating zone. This occurs when the engine valves are mechanically saturated as mentioned above. Opening and closing times of engine valves required to maintain desired APC can change depending on environment such as ambient pressure and intake manifold temperature.

A modified maximum HCCI fueling rate signal is provided to a comparator 310 that compares the modified maximum HCCI fueling rate to a desired fuel rate signal that originates from the driver. The desired fuel rate may be obtained by a pedal position sensor (not shown) providing a signal to a fuel rate module 311. The desired fuel signal from the driver and the modified maximum fuel rate are compared. When the desired fuel rate from the driver is outside of the modified maximum HCCI fuel signal, then a spark-injected mode is requested. If the desired fuel rate from the driver is within the modified maximum HCCI fueling rate, then an HCCI mode is maintained. The HCCI mode and the SI mode are controlled by a combustion control module 312, a spark control module 314 and a fuel delivery module 316. The combustion control module 312 switches between an SI and HCCI control. The spark control module 314 may also switch between an HCCI and an SI mode. The spark control module 314 may determine the timing and duration of the spark. The fuel delivery module 316 may also switch between SI and HCCI modes. The fuel delivery module 316 may determine the manner, timing and/or amount of fuel delivery.

Figure 2A:
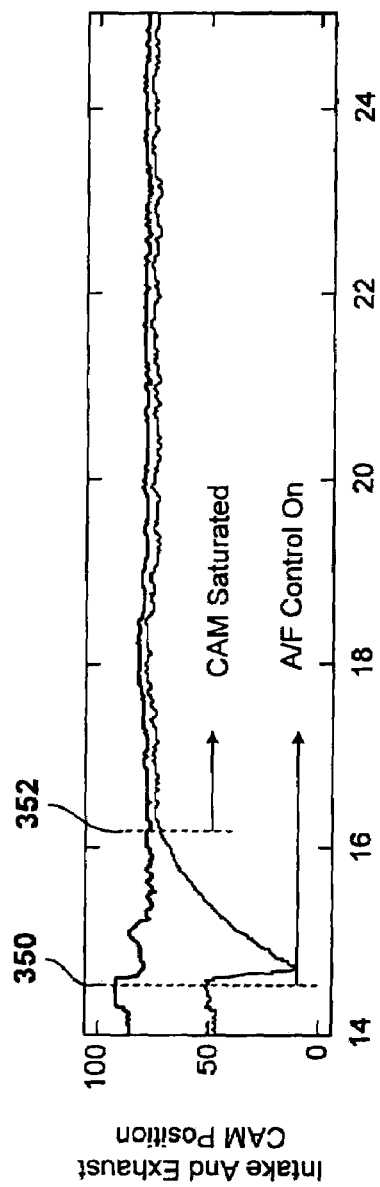
FIG. 2A plot of cam position versus time illustrating cam saturation an air/fuel control.
Figure 2B:
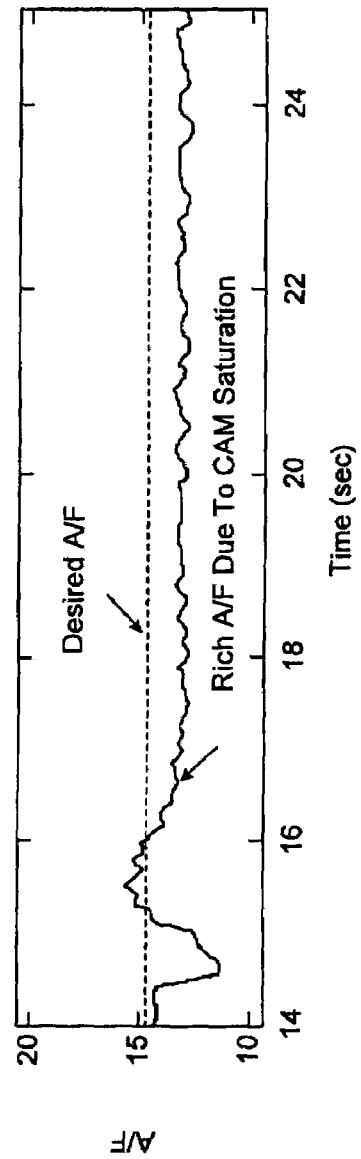
FIG. 2B is a plot of air/fuel ratio versus time illustrating rich air/fuel ratio and desired ratio.

Referring now to FIG. 2A, a plot of an intake and exhaust cam that illustrates combustion mode switching from SI to HCCI 350 and a cam saturated position (NVO) 352. As can be seen in FIG. 2B, the desired air fuel ratio is exceeded during combustion mode transition from SI to HCCI and decreases to rich in HCCI mode after the cam saturated time 352 of FIG. 2A. This is because an HCCI mode, unlike conventional engines, intake air charged to the cylinders is controlled by the intake and exhaust valve timings, since the engine operates with manifold absolute pressure approaching ambient barometric conditions. Given the rate of external EGR, intake manifold temperature and ambient pressure, the intake and exhaust valve timings determine the mass of air to the cylinders. By limiting the boundaries of the modified maximum HCCI fuel rate, unstable HCCI conditions due to rich air fuel ratio are prevented.

Figure 3:
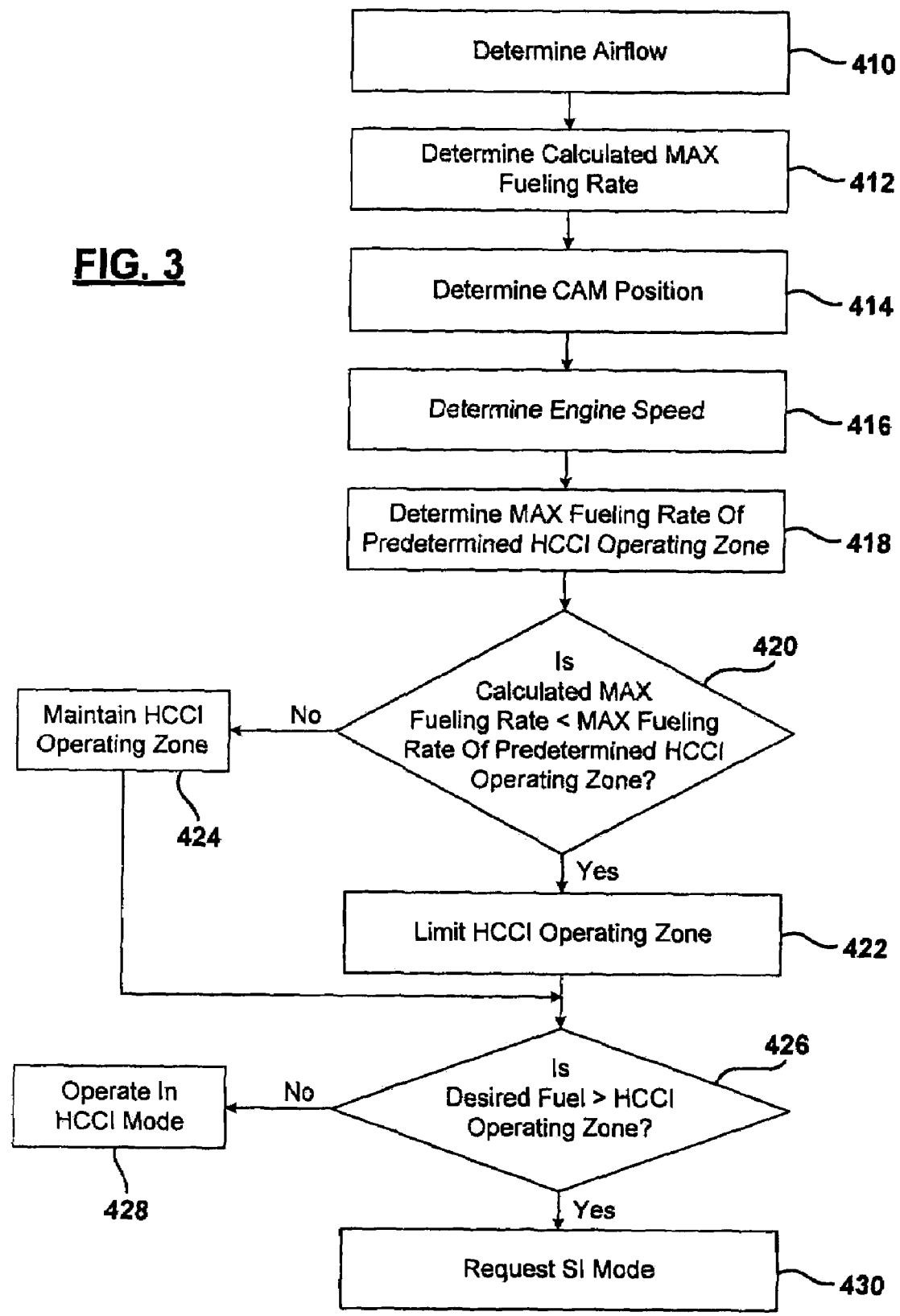
FIG. 3 is an HCCI state flowchart of a method for controlling the engine according to the present disclosure.

Referring now to FIG. 3, a method of operating an engine includes determining an airflow in step 410. The airflow may be the measured mass airflow from a mass airflow sensor. In step 412, a calculated maximum fueling rate is determined by multiplying the measured air flow by an inverted stoichiometric airflow ratio. That is, the measured mass airflow is divided by the stoichiometric airflow ratio. In step 414, a cam position is determined. More specifically, determining when a cam position is saturated is determined. When the negative valve overlap is mechanically saturated (i.e., NVO=minimum NVO), then the maximum airflow condition of the HCCI engine is achieved. In step 416, the engine speed is determined. In step 418, the engine speed is used to determine the maximum fueling rate of a pre-determined HCCI operating zone.

In step 420, the calculated maximum fueling rate is compared to the maximum fueling rate of a pre-determined HCCI operating zone calculated in step 418. When the calculated maximum fueling rate is less than the maximum fueling rate of the pre-determined HCCI fueling zone, step 422 limits the HCCI operating zone to a modified HCCI maximum fueling rate. In step 420, when the maximum fueling rate is not less than the maximum fueling rate of the pre-determined HCCI operating zone, the engine is being operated within the HCCI operating zone and thus step 424 maintains the operation in the HCCI operating zone.

After steps 422 and 424, the desired fuel rate is compared to the HCCI operating zone. When the desired fuel rate exceeds the boundaries of the HCCI operating zone, a spark-ignited mode for the engine is requested in step 430. That is, a change or switch from the HCCI operating zone into an SI mode is performed. Step 426 may use the modified maximum HCCI fuel rate or the HCCI fuel rate if a modified maximum HCCI fuel rate is not determined.

Referring back to step 426, if the desired fuel rate is not greater than or outside of the HCCI operating zone, then operation in the HCCI mode is maintained in step 428.

By providing a modified maximum HCCI fuel rate, robust and stable HCCI engine operation is provided while avoiding emission spikes due to misfires or partial burns. Drivability is also improved using the present disclosure.

Those skilled in the art can now appreciate from the foregoing description that the broad teachings of the present disclosure can be implemented in a variety of forms. Therefore, while this disclosure has been described in connection with particular examples thereof, the true scope of the disclosure should not be so limited since other modifications will become apparent to the skilled practitioner upon a study of the drawings, the specification and the following claims.

What is claimed is:

1. A method comprising:
   determining a first maximum fuel rate;
   determining a desired fuel rate from an operator input;
   modifying the first maximum fuel rate to a second maximum fuel rate in response to a measured mass airflow, a position of a camshaft that actuates at least one of an intake valve and an exhaust valve, and the first maximum fuel rate; and
   operating an engine in a spark ignited mode when the desired fuel rate is greater than the second maximum fuel rate.

2. A method as recited in claim 1 further comprising operating the engine in an homogeneous charge compression ignition (HCCI) mode when a the desired fuel rate is less than or equal to the second maximum fuel rate.

3. A method as recited in claim 1 wherein determining the first maximum fuel rate comprises determining the first maximum fuel rate in response to engine speed.

4. A method as recited in claim 1 wherein modifying comprises modifying the first maximum fuel rate to the second maximum fuel rate in response to a relative cam position.

5. A method as recited in claim 1 wherein modifying comprises modifying the first maximum fuel rate to the second maximum fuel rate in response to a relative cam position corresponding to a minimum negative valve overlap.

6. A method as recited in claim 1 wherein modifying comprises modifying the first maximum fuel rate to the second maximum fuel rate in response to a calculated maximum fuel rate determined in response to the measured mass airflow.

7. A method as recited in claim 1 wherein modifying comprises modifying the first maximum fuel rate to the second maximum fuel rate in response to a relative cam position corresponding to a mechanical saturation.

8. A method as recited in claim 1 further comprising determining a calculated maximum fueling rate by dividing the measured mass airflow by stoichiometry and wherein modifying comprises modifying the first maximum fuel rate to the second maximum fuel rate in response to the calculated maximum fueling rate.

9. A method of controlling an engine comprising:
   determining a mass airflow for the engine;
   determining an engine speed;
   determining a first maximum fueling rate in response to the engine speed;
   determining a desired fueling rate based on an operator input;
   determining a position of a camshaft that actuates at least one of an intake valve and an exhaust valve;
   when the position of the camshaft corresponds to a saturated position, modifying the first maximum fueling rate boundary to a second maximum fueling rate based on the mass airflow; and
   entering a spark ignition mode when the desired fueling rate is greater than the second maximum fueling rate.

10. A method as recited in claim 9 further comprising operating the engine in an homogeneous charge compression ignition (HCCI) mode when a the desired fueling rate request is less than or equal to the second maximum fueling rate.

11. A method as recited in claim 9 further comprising determining a calculated fueling rate from the mass airflow and wherein modifying the first fueling rate to the second maximum fueling rate comprises modifying the first fueling rate to the second maximum fueling rate based on the calculated fueling rate.

12. A system comprising:
   an homogeneous charge compression ignition (HCCI) operating zone boundary module determining a first maximum fuel rate;
   a fuel rate module determining a desired fuel rate from an operator input;
   a switch module modifying the first maximum fuel rate to a second maximum fuel rate in response to a measured mass airflow, a position of a camshaft that actuates at least one of an intake valve and an exhaust valve, and the first maximum fuel rate; and
   a combustion control module operating an engine in a spark ignited mode when the desired fuel rate is greater than the second maximum fuel rate.

13. A system as recited in claim 12 wherein the combustion control module operates the engine in an HCCI mode when the desired fuel rate is less than or equal to the second maximum fuel rate.

14. A system as recited in claim 12 wherein the HCCI operating zone boundary module determines the first maximum fuel rate in response to engine speed.

15. A system as recited in claim 12 wherein the switch module modifies the first maximum fuel rate to the second maximum fuel rate in response to a relative cam position.

16. A system as recited in claim 12 wherein the switch module modifies the first maximum fuel rate to the second maximum fuel rate in response to a relative cam position corresponding to a minimum negative valve overlap.

17. A system as recited in claim 12 wherein the switch module modifies the first maximum fuel rate to the second maximum fuel rate in response to the measured mass airflow.

18. A system as recited in claim 12 wherein the switch module modifies the first maximum fuel rate to the second maximum fuel rate in response to a relative cam position corresponding to a mechanical saturation.

19. A system as recited in claim 12 wherein the switch module modifies the first maximum fuel rate to the second maximum fuel rate in response to a calculated maximum fueling rate that is determined by dividing the measured mass airflow by stoichiometry.

20. A system as recited in claim 12 wherein the engine comprises a direct injection engine.

* * * * *